United States Patent [19]
Amico

[11] 3,969,976
[45] July 20, 1976

[54] EXPANSION UNIT

[76] Inventor: Peter Amico, 4854 Glenfield Drive, Syracuse, N.Y. 13215

[22] Filed: Sept. 5, 1974

[21] Appl. No.: 503,352

[52] U.S. Cl............................................ 85/75; 85/85
[51] Int. Cl.²........................................ F16B 13/04
[58] Field of Search ..................... 85/75, 76, 74, 85

[56] References Cited
UNITED STATES PATENTS

| | | | |
|---|---|---|---|
| 831,464 | 9/1906 | O'Leary | 85/76 |
| 943,906 | 12/1909 | Zifferer | 85/75 |
| 1,513,301 | 10/1924 | Wahlberg | 85/74 |
| 1,802,270 | 4/1931 | Rawlings | 85/85 |
| 2,762,119 | 9/1956 | Jackson | 85/85 |
| 3,115,056 | 12/1963 | Teeple | 85/76 |
| 3,250,170 | 5/1966 | Siegel | 85/76 |
| 3,577,825 | 5/1971 | Reusser | 85/76 |

Primary Examiner—Roy D. Frazier
Assistant Examiner—Thomas J. Holko

[57] ABSTRACT

An improved expansion unit made from heavy sheet metal for use in supporting a ceiling or roof, particularly a mine roof, comprises a wedge and a cylindrical expansion shell having a taper provided by a plurality of lateral serrations. The serrations are of gradually diminishing height designed to ensure a uniformly parallel expansion of the shell in the pre-drilled hole of the roof when the wedge is driven downwardly.

5 Claims, 6 Drawing Figures

EXPANSION UNIT

BACKGROUND OF THE INVENTION

This invention relates to expansion units made from heavy sheet metal for use in supporting a ceiling or roof, especially a mine roof. In the use of these and similar units, holes are drilled vertically into the mine roof usually in the most stable part of the terrain. A roof bolt is directed through a supporting plate engaged with the roof into the pre-drilled hole. The roof bolt assembly is a threaded rod which is anchored by means of an expansion unit inserted into the pre-drilled hole. The expansion unit contains a threaded wedge or plug for receiving the roof bolt. By threading the bolt into the expansion unit, the latter is caused to expand in the hole and to firmly grip the sides thereof. A compression of the strata in the mine roof results from the tightening of the threaded rod anchored at one end by the expansion device and the plate anchored at the bottom of the rod and at the ceiling proper.

By spacing such expansion units 4, 8 or 12 feet apart and by using a predetermined torque of 150–220 foot pounds in the threading of the bolt, internal pressures of up to 16,000 psi or higher are commonly generated. Because of the magnitude of these forces, commercially successful expansion units must meet the following performance criteria; (1) they must maintain their physical integrity without serious deformation or ripping; (2) they must not rotate in the hole when torque is applied to the threaded bolt so that maximum and efficient expansion can be obtained; (3) they must anchor themselves in the hole sufficiently to avoid being pulled downwardy even for fractions of inches. They must not bleed off (lose friction).

Heretofore most expansion shells have been formed from malleable iron castings due to non-uniform thickness and contour of the components needed to provide a suitable wedging action. Attempts to simulate these castings with shells formed of sheet metal have met with numerous difficulties due to metal failure under the large forces present. This invention is directed to the fulfillment of this need; i.e. a suitable expansion unit made from sheet metal which is equal to or better than the iron casting type and can maintain its physical integrity and holding power in various types of rock strata.

Various means have been attempted in the prior art to accomplish this purpose. For example, U.S. Pat. No. 3,250,170, in the name of Norman H. Siegel, and assigned to the same assignee as the instant application, describes an expansion shell formed from heavy sheet metal and provided with a series of "crater-like extrusions" punched outwardly from the metal. When a wedge is driven downwardly, these extrusions are said to provide anchorage and holding power exceeding the tensile strength of the roof bolt. In actual field use, the Siegel shell has encountered difficulties in certain applications due to failure of the metal where excessive frictional forces have been generated in the harder types of rock strata. Other means have also met with various problems and difficulties. For example, use of expansion units having relatively parallel and smooth sides, in addition to not having the requisite resistance to rotation, will tend to bow in the hole with the bottom of the unit usually collapsing inwardly as a wedge or other means is driven downwardly to expand the unit.

SUMMARY OF THE INVENTION

In the search for an improved expansion unit which will meet the aforedescribed performance criteria, it has now been found that there are three major requirements. First, the utilization of the longitudinal external surface area of the unit must be maximized; that is to say, simultaneous contact should be made with the internal wall of the hole all along the length of the unit. Second, the unit must be provided with slight external taper effective before it is placed in the hole; in other words, the external sides of the unit must slant inwardly from bottom to top of the unit. Third, the cross-section of the unit must approximate a true circle or define generally circular arcs so that it will fit snugly in the hole. Expressed alternatively, the unit must approximate the shape of a cylinder and must be capable of maintaining this cylindrical shape as severe forces are exerted upon it.

If these requirements are met, the result will be an essentially parallel expansion of the unit along its entire length which has now been found to be the key to successful performance. This parallel expansion is considered to be necessary to successful commercial application in the field. As the unit is expanded by the application of torque to the threaded roof bolt, a tapered wedge or plug is driven downwardly thereby causing the leaves of the expansion unit to expand uniformly along the entire length of unit and exert pressure against the hole. The result of this parallel expansion will be the exertion of equal pressure at points all along the vertical depth of the predrilled hole thereby effecting a uniform outward frictional force and consequent increased holding power.

The above requirements are met in the expansion unit of the present invention by the following characteristics. The unit will be generally in the shape of a cylinder formed by a manufacturing process that involves a series of metal forming steps accomplished by progressive die operations using controlled presses. This method of manufacture is particularly important because the usual methods of forming these devices by conventional metal forming and stamping operations will be unsatisfactory since a true cylindrical shape cannot be achieved without serious distortion which will adversely affect performance. Such conventional procedures are described, for example, in the aforementioned Siegel patent (U.S. Pat. No. 3,250,170). The cylindrical shape is necessary in order to closely and snugly fit into the pre-drilled hole so as to avoid spinning of the unit in the hole and to provide maximum surface contact to achieve maximum friction and holding power.

The cylindrical expansion unit of the invention comprises a pair of like opposed arcuate leaves. Each of said leaves converges at the top in an inverted "Y" shape to form a strap connecting to the other leaf. The strap is generally an inverted U-shape, except that in a preferred embodiment, the horizontal portion of the U is provided with a gently depressed groove at about its midpoint. The purpose of this depressed groove will be explained hereinafter.

Each leaf is provided at its free bottom with an external cuff formed by outwardly folding over the metal to a limited extent. Between the strap-connected top of the unit and the free bottom ends of the leaves, there are provided a series of serrations extending laterally across the leaves and dimensioned in such a fashion that before the unit is placed in the hole they provide a gradually diminishing diameter of the unit which will be widest at the bottom and narrowed at the top. This configuration is maintained by the inherent, spring-like nature of the U-strap. It is essential that these serrations be dimensioned so as to provide the overall unit with the slight external taper mentioned previously. The nature and dimensions of these serrations and the cuff will be described in greater detail later, but it is important to note that these serrations are not provided indiscriminately on the external surfaces, and do not produce a "washboard" effect on the internal surfaces of the leaves. In the present invention, the internal surfaces of the leaves are relatively even and do not have the same "hills and valleys" as the external surfaces, so that the wedge (to be described shortly) may travel relatively smoothly without binding. As mentioned, these external serrations are formed by a controlled press operation.

Upon placement of the unit in the hole, a snug fit (due to the aforementioned springiness of the strap) will be obtained with each serration touching the walls of the hole. The expansion of the unit is accomplished by means of a conical wedge having a threaded aperture to receive the roof bolt and disposed between the connected tops of the leaves. The wedge is provided with a U-shaped groove adapted to loosely receive the strap. The size relationship of the wedge, the U-strap and the leaves is purposely adjusted to allow a degree of slack. In other words, before expansion, the wedge will rest on the top of the leaves and can be easily displaced upwardly until it hits the strap. This slack or "play" is needed so that, upon application of torque to the rod, the wedge will instantly be jolted downwardy to immediately begin the expansion process. The most critical instant in this process has been found to be the initial entry of the wedge into the leaves upon application of torque. Without this provided "slack", an immediate and instantaneous expansion will not be ensured so that undesirable spinning of the unit in the hole may occur.

In operation, when torque is applied to the roof bolt, it will engage the strap at the top and wider end of the conical wedge. The wedge is then drawn down into the leaf portion of the unit and the leaves are forced outwardly. By virtue of the truly cylindrical shape of the unit, and the external taper provided by the serrations, the leaves are caused to expand in parallel fashion in such a manner that the cuff and the edges of each serration on each leaf will make contact with the inner wall of the pre-drilled hole simultaneously. As a result of this parallel expansion, bowing or other deformation of the leaves is prevented.

By way of further explanation, it will be recognized that a critical feature of the invention is the provision of an effective external taper to the unit in its manufactured state prior to its insertion in the hole. This taper is provided by a series of serrations (or ridges) progressively decreasing in effective diameter towards the top of the unit. It has been found that for most applications utilizing standard 1⅜ inch holes, the effective taper should be in the range of about 5° to about 9°, with about 6° to about 8° being more preferred, and about 7° being most preferred. (This angle will be measured from the vertical). Once the unit is placed in the hole, the spring-like nature of the strap will cause a snug fit in the hole with contact being made between each serration and the hole wall. Thus, the serrations should be so dimensioned in relation to each other as to provide for simultaneous contact with the hole wall. In practice, the thickness of the metal at the cuff end will be twice the thickness at the top (above the topmost serration). The thickness of each serration will gradually decrease towards the top of the unit, but it is not necessary that there be a uniform delta from serration to serration due to variations in spacing between them. The essential feature, as mentioned, is that the edge of each serration contact the hole simultaneously when the unit is placed in the hole.

DESCRIPTION OF DRAWINGS AND PREFERRED EMBODIMENTS

The above and other novel features of the invention will now be described in conjunction with the accompanying drawings employed for illustrative purposes.

In the drawings, where like reference characters indicate like parts:

Figure 1:
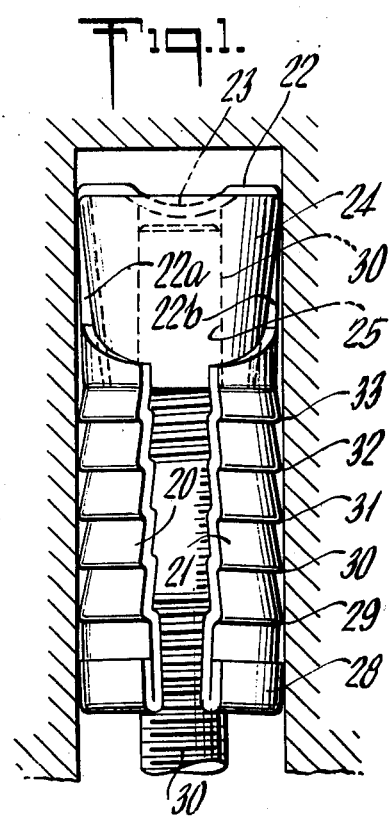
FIG. 1 is a front elevational view of the expansion unit in a pre-drilled hole prior to expansion and shows the conical wedge and threaded roof bolt.

Referring to the drawings, there is shown a one-piece heavy gauge sheet metal cylindrical expansion unit having a pair of like opposed arcuate leaves 20 and 21 which are generally cylindrical segments. The leaves are joined at the top by a U-shaped strap 22. In actual use in a mine roof hole or the like, FIG. 1 shows the roof bolt 30 (dotted line) engaging a depression 23 in strap 22. The purpose of this depression shape is to retard the normal tendency of the strap to be forced upwards into an inverted V when the bolt engages the strap and pulls down the wedge 24. The consequence of this undesirable upward bend would be to force the upper portion of the leaves into the wedge, causing undesirable friction and binding. The depression 23 allows the wedge to travel freely during its initial downward thrust and contributes to the parallel expansion of the leaves.

Figure 3:
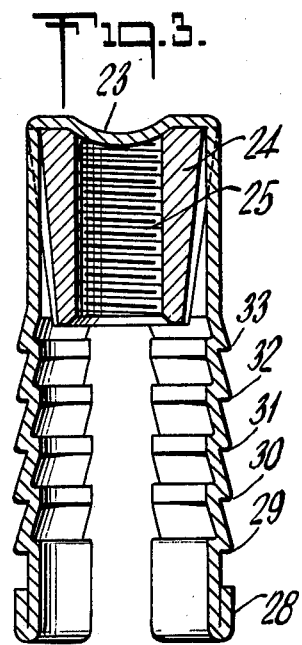
FIG. 3 is a longitudinal section of the cylindrical leaves and conical wedge, taken on the line 3—3 of FIG. 2.
Figure 5:
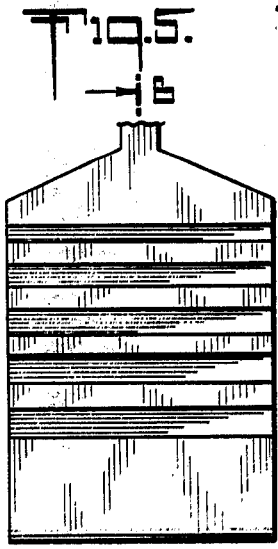
FIG. 5 is a fragmentary view of one end of the blank with the end folded over to form a cuff.

The conical wedge 24 is adapted to travel down between leaves 20 and 21 by virtue of a central threaded aperture 25 which receives the thread roof bolt 30. The upper portion of the wedge is wider than the internal diameter of the imaginary cylinder defined by the leaves 20 and 21, so that as torque is applied to the roof bolt 30, the wedge is forced down causing the leaves to expand. The strap 22 has substantially parallel portions 22a and 22b merging with the tapering upper edge portions of the leaves 20 and 21. As shown in FIG. 3, the strap 22 and the upper edge portions 26A and 26B generally form an inverted "Y" shape. The wedge 24 is provided with a continuous U-shaped groove 27 adapted to loosely embrace the strap on the top and sides of the wedge.

Figure 6:
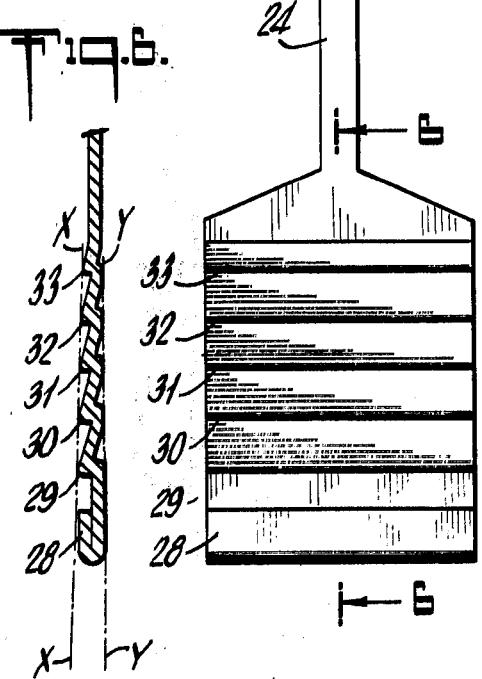
FIG. 6 is a fragmentary edge view of FIG. 5 showing the configurations of the internal and external surfaces of the leaves, and the external taper provided by the progressively decreasing height of the serrations.

Each of the leaves 20 and 21 is provided at its free bottom with an external upwardly turned integral arcuate cuff 28. Each leaf is also provided with a plurality of serrations 29, 30, 31, 32 and 33 extended laterally across the leaves and defining circumferential arcs. In FIG. 1, the most preferable embodiment is shown wherein five serrations are shown. These serrations will be of gradually decreasing height; that is, the height (taken from the vertical) of serration 29 will be less than the height of cuff 28, the height of serration 30 will be less than that of serration 29, and so forth. The progressively decreasing heights of these serrations is shown in FIG. 6. The height and width of these serrations will vary depending upon the overall size of the expansion unit and the pre-drilled hole, but the critical requirement is that the cuff and the serrations be so dimensioned in relation to each other as to provide the overall unit with a gradually diminishing diameter which will be widest at the bottom and narrowest at the top. It is considered essential that these dimensions be predetermined so as to provide the overall unit with a slight external taper (as shown by the line X—X in FIG. 6) prior to its insertion in the hole, so that the necessary parallel expansion will be obtained.

Referring more particularly to FIG. 6, it will be seen that the external taper defined by the line X—X exists in the unit as manufactured and before placement in the hole. In FIG. 1 it will be observed that the external edges of the serrations, all contact the inner wall of the hole and thus take on a vertical configuration. This simultaneous contact is facilitated by the inherent spring-like nature of the strap. As a result, the internal surfaces of the leaves (e.g. as defined by the line Y—Y of FIG. 6) will downwardly taper towards each other (not shown) in FIG. 1. The spring-like quality of the unit thus causes the leaves to fit snugly in the hole so that initial undesirable twisting is avoided.

It will be noticed in FIG. 1, that each edge of each of serrations 29-33, and cuff 28, contact the inner wall of the hole simultaneously. Due to the inwardly tapering surfaces of the leaves 20 and 21, the action of the conical wedge will force the leaves apart in a parallel fashion. Also, since the inner surfaces of the leaves are relatively smooth (as shown in FIG. 6), the wedge can travel freely in a downward direction without bumping or binding. This relatively smooth surface is preferred to a "washboard" effect which would be formed by an indiscriminate stamping, rolling, or pressing operation.

Figure 2:
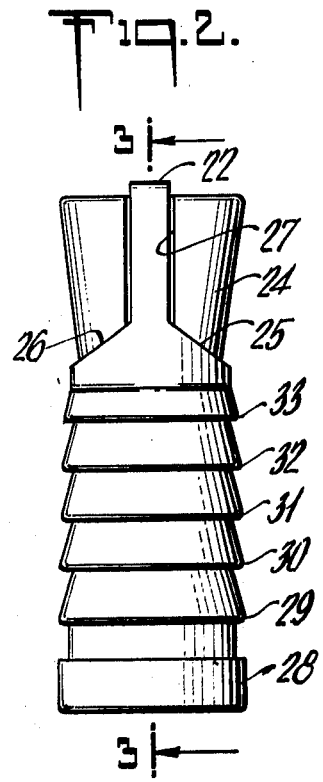
FIG. 2 is a side elevational view of the cylindrical leaves and the conical wedge.

Referring to FIG. 2, it will be seen that the continuous U-groove 27 in the wedge 24 centers the wedge in relation to the leaves 20 and 21 by virtue of the loose engagement of strap 22. In this fashion, a controlled travel of the wedge is accomplished in a true downward direction due to the fact that it is influenced to remain centered as the threaded bolt contacts depression 23 of strap 22 when the bolt is torqued.

As another embodiment of the invention, it will be desired, in certain typs of soils, to continue the strap 22 down towards the cuff 28 on each of the leaves 20 and 21. This is accomplished by inserting parallel slits at the top of each leaf, e.g., where portion 22a merges with leaf 20, and running such slits downwardly along a portion of the shell, most preferably to within about an inch of the cuff 28. As a result of this slit formation, the shell will have a tendency to flare out and thereby create increased holding power for certain applications.

Figure 4:
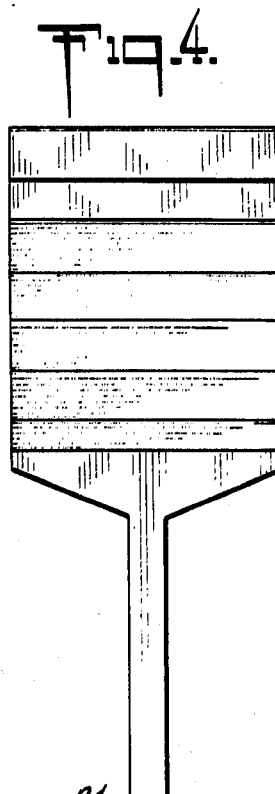
FIG. 4 is a blank from which the leaves are progressively shaped into the form shown in FIG. 1, and shows the serrations thereon.

In order to obtain the true cylindrical shape necessary in the present invention, ordinary sheet metal forming operations have been found unsatisfactory. It is preferred herein to utilize a progressive die operation. In the formation of the expansion unit described herein, a blank of heavy gauge sheet metal (e.g. hot rolled pickled and oiled steel approximately 0.120 inch thick) is inserted into a progressive die system which generally involves blanking out sections of metal so as to form the shape shown in FIG. 4, and partially turning over the ends of the resulting blank to form a partial cuff. The slitting operation can be performed at this stage or subsequently. The blank is then subjected to a progressive die operation. In this operation, a cylindrical die presses the blank of FIG. 6 down into a cylindrical form to simultaneously form the leaves into their generally cylindrical shape, and to form the serrations 29 to 33. At the same time the depression 23 is produced. Next, the cuff 28 is formed by completely turning the ends over. Finally, the leaves are bent up slightly into the nearly finished product. Finally, the wedge 24 is placed on the strap 22 and the leaves 20 and 21 are turned or wrapped against the wedge by pushing the unit down into a closely fitting hole to form the final assembly.

What is claimed is:

1. An expansion unit for mine roof bolts and the like comprising a generally cylindrical shell formed from sheet metal and wedging means for expanding said shell, wherein said shell comprises a pair of like opposed arcuate leaves connected at one end by a generally U-shaped strap; each of said leaves (i) being provided at its free end with an external cuff having a solid, continuous upper edge formed by an outward foldover of metal; (ii) having a relatively smooth internal surface so as to allow free downward travel of said wedge without binding; and (iii) having an external surface provided with a plurality of lateral and outwardly extending serrations or ridges defining circumferential arcs, said serrations or ridges being of gradually diminishing radial height from the cuff end to the connected end so as to provide said unit with an effective external taper prior to insertion of the unit in a mine roof hole or the like; wherein said cuff and said ridges are dimensioned to ensure that, upon said insertion, the outer surface of said cuff and said ridges simultaneously contact the inner wall of said hole to thereby increase the holding power of said unit, so that expansion of said unit occurs in a substantially parallel fashion along substantially its entire length, and said unit maintains its generally cylindrical shape during said expansion.

2. The expansion unit of claim 1 wherein said effective external taper is in the range of about 6° to about 10° measured from the vertical.

3. The expansion unit of claim 1, wherein said wedging means comprises a conical wedge having a threaded aperture adapted to receive a mine roof bolt, said wedge being initially disposed between the connected ends of the leaves and being loosely embraced by said U-shaped strap, and wherein said U-shaped strap has a spring-like nature.

4. The expansion unit of claim 1, wherein said wedge is provided with a U-shaped groove adapted to loosely receive said strap, and wherein the relationship between said wedge, said strap and said leaves allows for a degree of slack just prior to initial expansion of the leaves.

5. The expansion unit of claim 1, wherein said effective external taper is in the range of about 7° to about 9° measured from the vertical.

* * * * *